United States Patent
Shibayama et al.

(10) Patent No.: US 10,787,843 B2
(45) Date of Patent: Sep. 29, 2020

(54) VEHICLE OPENING AND CLOSING BODY OPERATING DEVICE

(71) Applicant: AISIN SEIKI KABUSHIKI KAISHA, Kariya-shi, Aichi-ken (JP)

(72) Inventors: Satoshi Shibayama, Nagoya (JP); Sadayuki Makino, Nagoya (JP)

(73) Assignee: AISIN SEIKI KABUSHIKI KAISHA, Kariya-Shi, Aichi-Ken (JP)

(*) Notice: Subject to any disclaimer, the term of this patent is extended or adjusted under 35 U.S.C. 154(b) by 608 days.

(21) Appl. No.: 15/628,137

(22) Filed: Jun. 20, 2017

(65) Prior Publication Data

US 2018/0051495 A1    Feb. 22, 2018

(30) Foreign Application Priority Data

Aug. 16, 2016 (JP) ................. 2016-159485

(51) Int. Cl.
*E05B 83/10* (2014.01)
*B60J 5/04* (2006.01)
(Continued)

(52) U.S. Cl.
CPC ............... *E05B 83/10* (2013.01); *B60J 5/047* (2013.01); *E05B 15/0086* (2013.01);
(Continued)

(58) Field of Classification Search
CPC ........... Y10T 292/108; Y10T 292/1082; Y10T 292/1092; Y10T 292/1047; E05B 81/90;
(Continued)

(56) References Cited

U.S. PATENT DOCUMENTS 5,876,074 A * 3/1999 Dowling ................. E05B 81/20
                                                  292/201
6,079,757 A * 6/2000 Aubry ..................... E05B 77/28
                                                  292/201
(Continued)

FOREIGN PATENT DOCUMENTS

JP    2012-72645 A    4/2012
JP    2012067567 A *  4/2012
JP    2016-102324 A   6/2016

*Primary Examiner* — Kristina R Fulton
*Assistant Examiner* — Faria F Ahmad
(74) *Attorney, Agent, or Firm* — Buchanan Ingersoll & Rooney PC (57) ABSTRACT

A vehicle opening and closing body operating device includes: a full-open lock opening lever connected to a full-open lock configured to maintain an opening and closing body in a fully opened state, and configured to output release operating force to the full-open lock; an input lever connected to the full-open lock opening lever and an operating handle, and configured to rotate the full-open lock opening lever so as to output the release operating force; a release lever connected to the input lever through a connecting member, and configured to rotate the full-open lock opening lever through the connecting member and the input lever; an emergency input lever to which rotation operating force is inputted; and a cancel mechanism configured to move the connecting member from a connection position where the input and release levers are connected to a disconnection position where the input and release levers are disconnected.

3 Claims, 5 Drawing Sheets

(51) Int. Cl.
  *E05B 15/00* (2006.01)
  *E05B 85/24* (2014.01)
  *B60J 5/06* (2006.01)
  *E05B 83/40* (2014.01)
  *E05B 81/20* (2014.01)

(52) U.S. Cl.
  CPC ............... *E05B 85/243* (2013.01); *B60J 5/06* (2013.01); *E05B 81/20* (2013.01); *E05B 83/40* (2013.01); *Y10S 292/23* (2013.01); *Y10S 292/65* (2013.01); *Y10T 292/108* (2015.04); *Y10T 292/1047* (2015.04); *Y10T 292/1082* (2015.04); *Y10T 292/1092* (2015.04)

(58) Field of Classification Search
  CPC .......... E05B 79/20; E05B 81/06; E05B 81/14; E05B 81/16; E05B 81/21; E05B 83/40; E05B 83/10; E05B 15/0086; E05B 85/243; E05B 81/247; B60J 5/06; B60J 5/047; Y10S 292/23; Y10S 292/65
  USPC .................................... 292/DIG. 23, DIG. 65
  See application file for complete search history.

(56) References Cited

U.S. PATENT DOCUMENTS

| | | | | |
|---|---|---|---|---|
| 6,116,664 A * | 9/2000 | Wegner | ................... | E05B 81/66 292/201 |
| 6,637,783 B2 * | 10/2003 | Takamura | ............... | E05B 81/14 292/201 |
| 8,146,965 B2 * | 4/2012 | Akizuki | ................. | E05B 81/06 292/201 |
| 8,522,583 B2 * | 9/2013 | Cumbo | ................... | E05B 81/06 292/201 |
| 8,678,452 B2 * | 3/2014 | Nagaoka | ................ | E05B 77/265 292/201 |
| 8,789,861 B2 | 7/2014 | Takayanagi et al. | | |
| 8,827,328 B2 * | 9/2014 | Akizuki | ................. | E05B 81/06 292/201 |
| 8,919,827 B2 * | 12/2014 | Akizuki | ................. | E05B 81/06 292/201 |
| 9,428,942 B2 * | 8/2016 | Kim | ...................... | E02F 9/0891 |
| 2002/0171250 A1 * | 11/2002 | Kobayashi | .............. | E05B 77/30 292/216 |
| 2008/0105011 A1 * | 5/2008 | Machida | ................. | E05B 81/20 70/237 |
| 2009/0051173 A1 * | 2/2009 | Akizuki | ................. | E05B 77/26 292/216 |
| 2010/0327609 A1 * | 12/2010 | Akizuki | ................. | E05B 81/06 292/85 |
| 2011/0162419 A1 * | 7/2011 | Akizuki | ................. | E05B 77/28 70/141 |
| 2013/0000363 A1 * | 1/2013 | Akizuki | ................ | E05B 77/265 70/101 |
| 2014/0203572 A1 * | 7/2014 | Barmscheidt | ........... | E05B 77/28 292/200 |

* cited by examiner

VEHICLE OPENING AND CLOSING BODY OPERATING DEVICE

CROSS REFERENCE TO RELATED APPLICATIONS

This application is based on and claims priority under 35 U.S.C. § 119 to Japanese Patent Application 2016-159485, filed on Aug. 16, 2016, the entire contents of which are incorporated herein by reference.

TECHNICAL FIELD

This disclosure relates to a vehicle opening and closing body operating device.

BACKGROUND DISCUSSION

In the related art, for example, a vehicle opening and closing body operating device disclosed in JP 2012-072645 A (Reference 1) has been known. The vehicle opening and closing body operating device (remote control device) has a full-open lock opening lever (full-open lock lever) which is connected to a full-open lock (full-open door lock device) capable of maintaining an opening and closing body (slide door) in a fully opened state, and may output release operating force to the full-open lock. In addition, the vehicle opening and closing body operating device includes a release lever (motor power transmission lever) which is rotated by a release motor and connected to the full-open lock opening lever. Further, for example, in a state in which the release lever is rotated by operating the release motor together with the full-open lock opening lever in one direction from a release lever initial position (original position), the release operating force is outputted to the full-open lock from the full-open lock opening lever. In this case, the full-open lock is turned into a released state, and as a result, the opening and closing body in the fully opened state may be closed.

By the way, in Reference 1, since the release lever is connected to the full-open lock opening lever, when the release lever, together with the full-open lock opening lever, is stopped and maintained due to an electrical failure of the release motor in a state in which the release lever is rotated in one direction from the release lever initial position, the full-open lock is kept in the released state. Further, the opening and closing body in the fully opened state cannot be maintained by the full-open lock.

Thus, a need exists for a vehicle opening and closing body operating device which is not susceptible to the drawback mentioned above.

SUMMARY

A vehicle opening and closing body operating device according to an aspect of this disclosure includes: a full-open lock opening lever connected to a full-open lock configured to maintain an opening and closing body in a fully opened state, and configured to output release operating force to the full-open lock in accordance with a rotation from an original position; an input lever connected to the full-open lock opening lever and an operating handle, and configured to rotate the full-open lock opening lever so as to output the release operating force in accordance with a rotation from an input lever initial position which is interlocked with a closing operation of the operating handle from a handle neutral position; a release lever connected to the input lever through a connecting member to be rotated by a release motor, and configured to rotate the full-open lock opening lever through the connecting member and the input lever so as to output the release operating force in accordance with a rotation from a release lever initial position; an emergency input lever to which rotation operating force is inputted; and a cancel mechanism configured to move the connecting member from a connection position where the input lever and the release lever are connected to each other to a disconnection position where the input lever and the release lever are disconnected from each other in accordance with the rotation of the emergency input lever when the release lever is stopped in a state in which the release lever is rotated from the release lever initial position.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment of a vehicle opening and closing body operating device will be described. Further, hereinafter, a front-and-rear direction of a vehicle will be referred to as a "front-and-rear direction," and an upper side and a lower side in a height direction of the vehicle will be referred to as an "upper side" and a "lower side," respectively. In addition, an interior side in a width direction of the vehicle, which is directed toward the interior of a vehicle interior, will be referred to as a "vehicle interior side," and an exterior side in the width direction of the vehicle, which is directed toward the exterior of the vehicle interior, will be referred to as a "vehicle exterior side".

Figure 1:
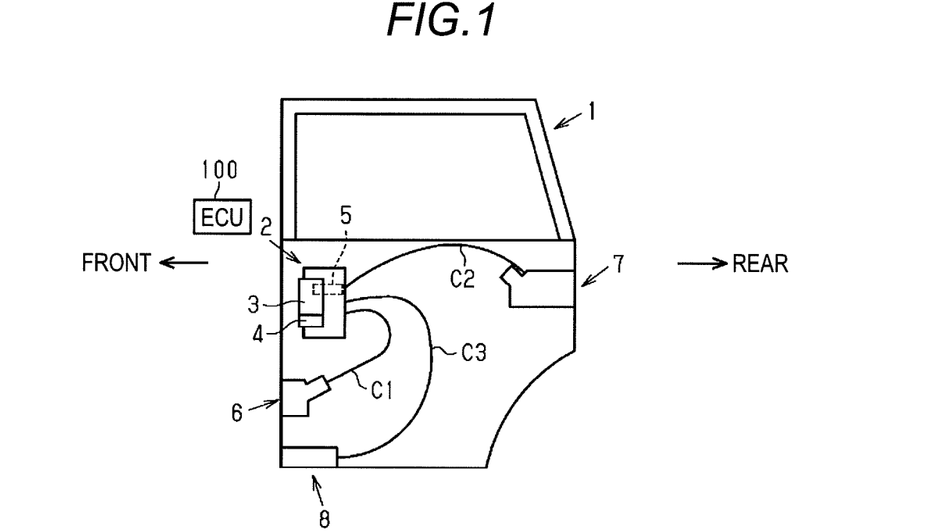
FIG. 1 is a front view illustrating a schematic configuration of a slide door.

As illustrated in FIG. 1, a slide door 1, which is a vehicle opening and closing body supported on a lateral portion of a vehicle body via an appropriate support member (not illustrated), is configured to open and close an opening of a boarding door following a movement in the front-and-rear direction.

A remote control device 2 is installed in the slide door 1. Further, an inside handle 3 is supported on the remote control device 2 to be rockable in the front-and-rear direction in a state of being exposed to the vehicle interior side of the slide door 1, and a lock operating knob 4 is supported below the inside handle 3 to be movable in the front-and-rear direction. The inside handle 3 is biased and maintained at an inside handle neutral position, as a second handle neutral position, by an appropriate spring. Further, an opening operation of rocking the inside handle 3 rearward, in an opening direction of the slide door 1, from the inside handle neutral position may be performed, and a closing operation of rocking the inside handle 3 forward, in a closing direction of the slide door 1, from the inside handle neutral position may be performed. The lock operating knob 4 may be moved in the front-and-rear direction, and switches a locked state and an unlocked state of the slide door 1.

Meanwhile, an outside handle 5 is supported on the vehicle exterior side portion of the slide door 1 to be rockable in the front-and-rear direction. The outside handle 5 is biased and maintained at a handle neutral position and an outside handle neutral position as a first handle neutral position, by an appropriate spring. Further, the outside handle 5 is configured to enable to perform an opening operation of rocking the outside handle 5 rearward from the outside handle neutral position in the opening direction of the slide door 1, and a closing operation of rocking the outside handle 5 forward from the outside handle neutral position in the closing direction of the slide door 1.

A front lock 6 and a rear lock 7 are installed at front and rear sides in the slide door 1, respectively, and a full-open lock 8 is installed at a lower side in the slide door 1. Each of the front lock 6 and the rear lock 7 is engaged with the vehicle body side and maintains the slide door 1 in a closed state (fully closed state or half opened state). Further, the front lock 6 and the rear lock 7 are connected to the remote control device 2 through cables C1 and C2, respectively, and receive release operating force from the remote control device 2 so as to allow the slide door 1 to be in an openable state with respect to the vehicle body. The full-open lock 8 is engaged with the vehicle body side and maintains the slide door 1 in a fully opened state. The full-open lock 8 is connected to the remote control device 2 through a cable C3, and receives release operating force from the remote control device 2 so as to allow the slide door 1 to be in a closable state with respect to the vehicle body.

Figure 2:
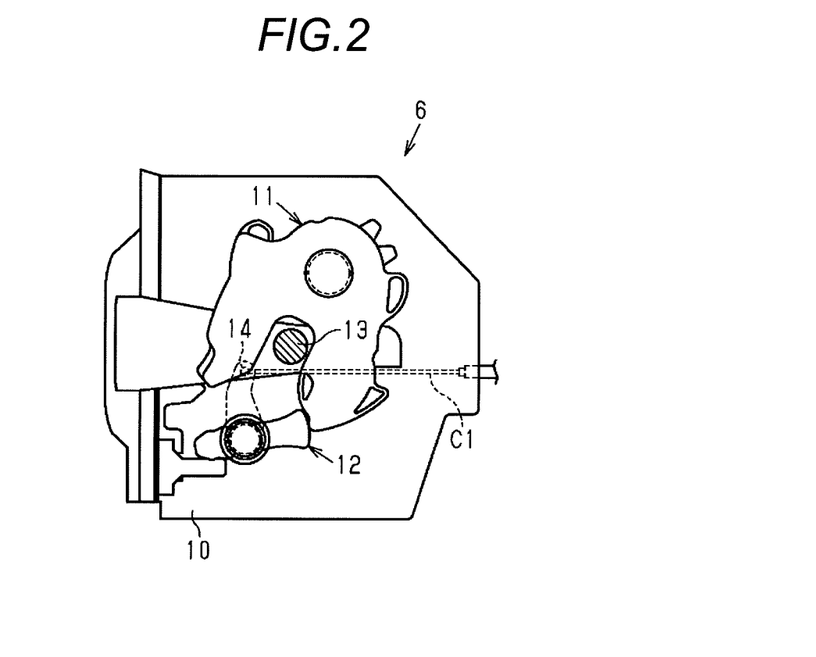
FIG. 2 is a schematic view illustrating a front lock.

Specifically, as illustrated in FIG. 2, the front lock 6 includes a base board 10 which is mounted on the slide door 1, and a latch 11 and a pawl 12 which are supported on the base board 10 to be rotatable about axes parallel to each other. Further, when closing the slide door 1, the latch 11, which is pressed against a striker 13 fixed to the vehicle body, meshes with the striker 13 while rotating, and simultaneously, the pawl 12 stops a rotation of the latch 11 such that the slide door 1 is maintained in the closed state. In addition, a pawl driving lever 14 is mounted on the pawl 12 so as to be integrally rotated. The pawl 12 is connected to one end portion of the cable C1 through the pawl driving lever 14, and as the cable C1, together with the pawl driving lever 14, is pulled by the remote control device 2, the pawl 12 is rotated to release the state of stopping the rotation of the latch 11. In this case, the latch 11 returns and rotates by being biased by a return spring (not illustrated) so as to release the striker 13 so that the slide door 1 is turned into the openable state with respect to the vehicle body.

Each of the rear lock 7 and the full-open lock 8 also has a structure that is similar to the aforementioned structure, and similarly operates.

Here, each of the inside handle 3 and the outside handle 5 may cooperate with the front lock 6, the rear lock 7, and the full-open lock 8 through the remote control device 2. The inside handle 3 and the outside handle 5 input power (operating force) thereof, as release operating force, to the front lock 6, the rear lock 7, and the full-open lock 8 through the remote control device 2 or the like, thereby turning the slide door 1 into the openable state or the closable state, as described above.

For example, in a state in which the slide door 1 is in the closed state, the inside handle 3, which is operated (opening operation) by an occupant to be rocked rearward from the inside handle neutral position, inputs release operating force to each of the front lock 6 and the rear lock 7 through the remote control device 2 or the like. Meanwhile, in a state in which the slide door 1 is in the fully opened state, the inside handle 3, which is operated (closing operation) by the occupant to be rocked forward from the inside handle neutral position, inputs release operating force to the full-open lock 8 through the remote control device 2 or the like.

Similarly, in a state in which the slide door 1 is in the fully opened state, the outside handle 5, which is operated (opening operation) by the occupant to be rocked rearward from the outside handle neutral position, inputs release operating force to each of the front lock 6 and the rear lock 7 through the remote control device 2 or the like. Meanwhile, in a state in which the slide door 1 is in the fully opened state, the outside handle 5, which is operated (closing operation) by the occupant to be rocked forward from the outside handle neutral position, inputs release operating force to the full-open lock 8 through the remote control device 2 or the like.

Next, the remote control device 2 will be described again.

Figure 3:
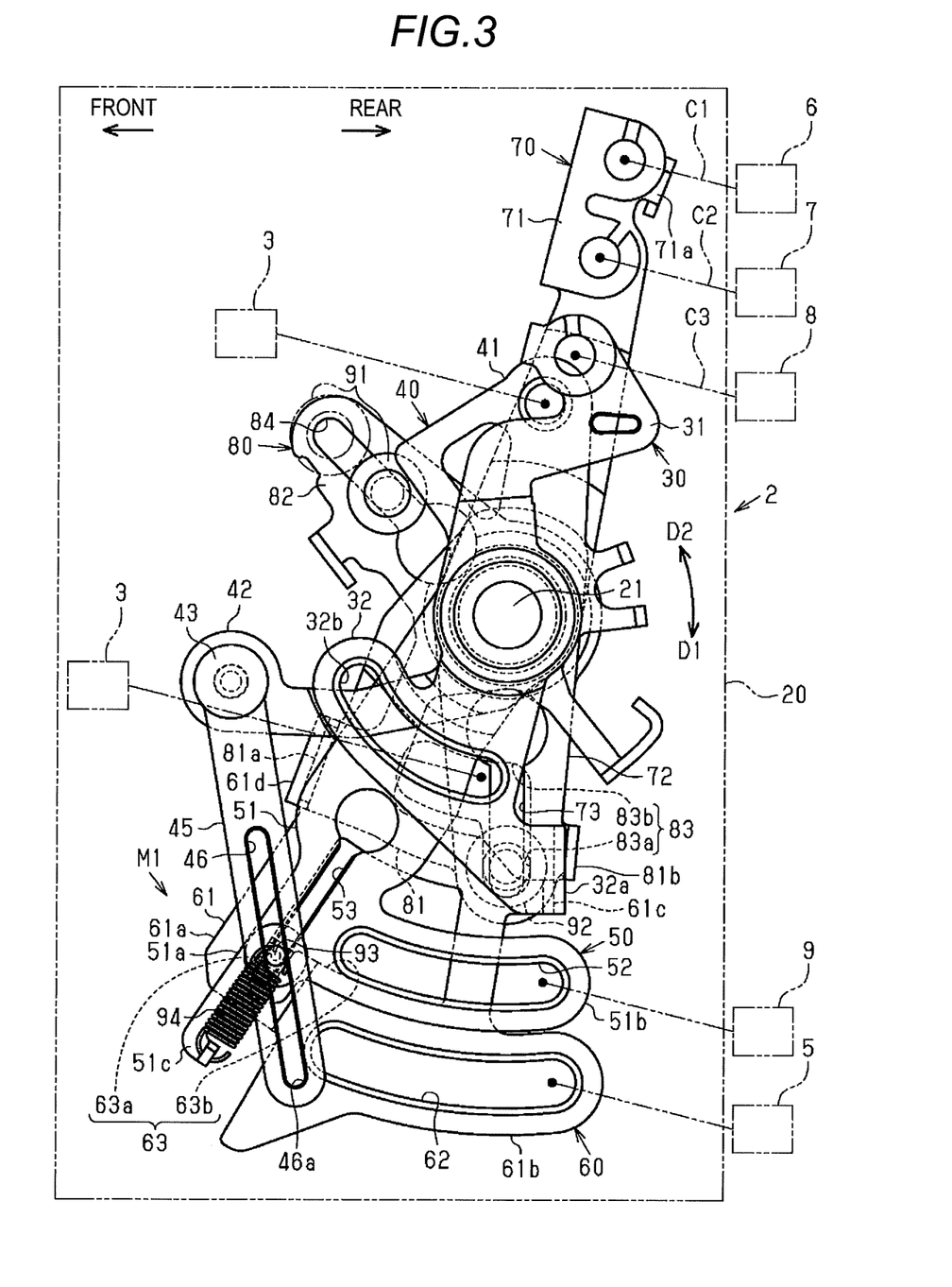
FIG. 3 is a front view illustrating a structure in an initial state with respect to a vehicle opening and closing body operating device according to an exemplary embodiment.
Figure 4:
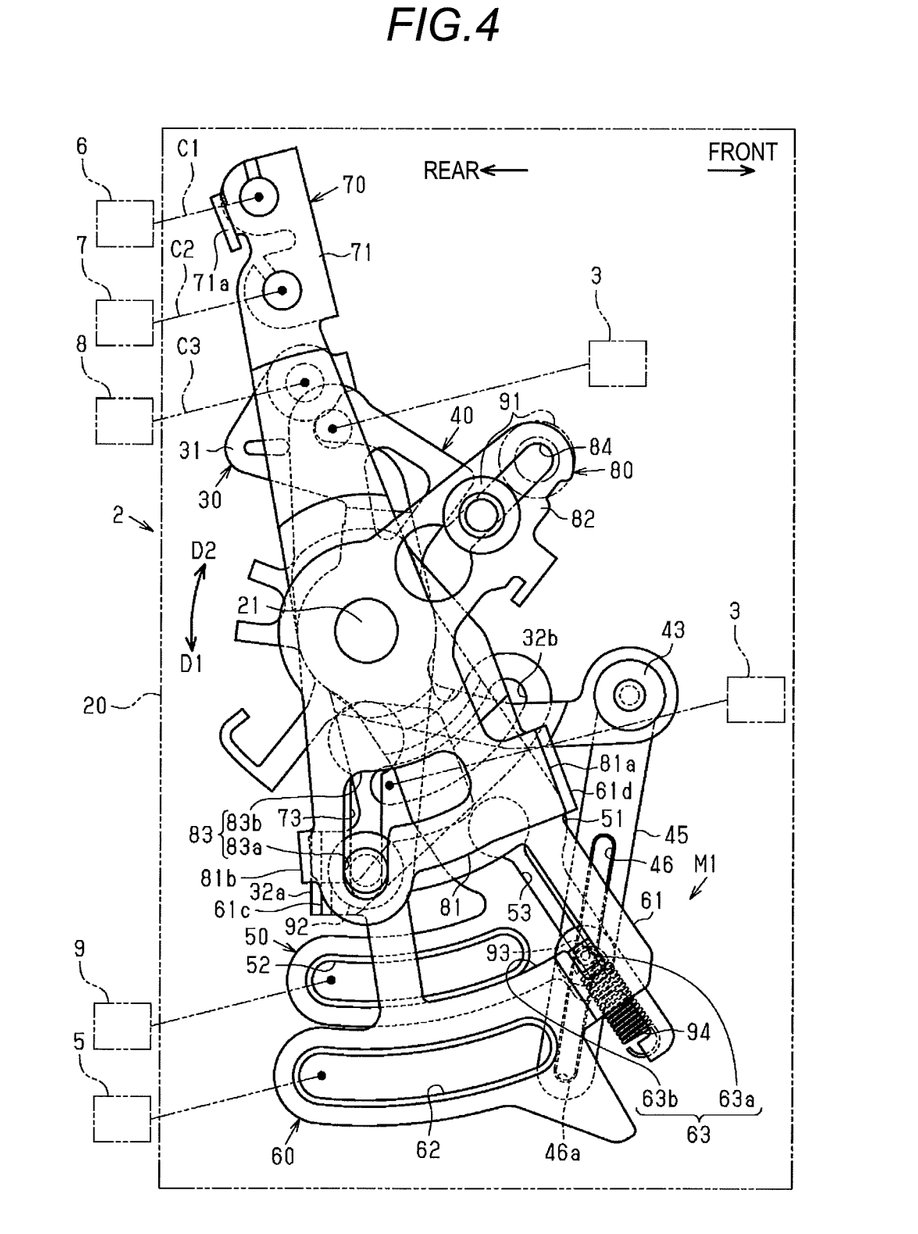
FIG. 4 is a rear view illustrating a structure in the initial state with respect to the vehicle opening and closing body operating device according to the exemplary embodiment.

As illustrated in FIGS. 3 and 4, the remote control device 2 includes a base plate 20 formed of, for example, a metal plate. In addition, the remote control device 2 includes a full-open lock opening lever 30, an inside handle lever 40 as an emergency input lever, a release lever 50, an outside handle lever 60 as an input lever, an opening lever 70, and a locking lever 80. All of the full-open lock opening lever 30, the inside handle lever 40, the release lever 50, the outside handle lever 60, the opening lever 70, and the locking lever 80 are formed of a metal plate, and overlap one another in a width direction of a vehicle to be close to the base plate 20 in this order. Further, the full-open lock opening lever 30 and the like are supported to be rotatable about a common support shaft 21 which stands from the base plate 20 toward the vehicle interior side (front side that is orthogonal to the page surface in FIG. 3) through the full-open lock opening lever 30 and the like.

The inside handle 3 and the lock operating knob 4 are supported on the base plate 20 at a side opposite to the side at which the full-open lock opening lever 30 and the like are disposed.

The full-open lock opening lever 30 has a pair of lever arms 31 and 32 which protrude in substantially radially opposite directions with respect to the support shaft 21. The lever arm 31 is formed in a substantially S shape, and has a tip end portion connected to the full-open lock 8 (pawl driving lever 14) via the cable C3.

In the lever arm 32, a tip end portion of the lever arm 32, which is spaced apart from the support shaft 21, extends in a first rotation direction D1 (clockwise direction in FIG. 3) (hereinafter, simply referred to as the "first rotation direction D1") around the support shaft 21, so that the lever arm 32 is formed in a substantially L-shape. Further, a substantially quadrangular claw-shaped interlocking abutment piece 32a is bent approximately at a right angle toward the outside handle lever 60 (a back side orthogonal to the page surface in FIG. 3) at a tip end of the lever arm 32 which is spaced apart from the support shaft 21, that is, a tip end of the lever arm 32 which precedes in a second rotation direction D2 (counterclockwise direction in FIG. 3) (hereinafter, simply referred to as the "second rotation direction D2") opposite to the first rotation direction D1 around the support shaft 21. In addition, a substantially arc-shaped oblong hole 32b is formed through the tip end portion of the lever arm 32 to be centered on the support shaft 21.

The full-open lock opening lever 30 is mechanically linked to the inside handle 3 in the oblong hole 32b. When the inside handle 3 is subjected to the closing operation, the oblong hole 32b is pressed so that the full-open lock opening lever 30 is rotated in the second rotation direction D2. In this case, the cable C3 connected to the lever arm 31 is pulled toward the remote control device 2, and the full-open lock 8 is released. Meanwhile, the full-open lock opening lever 30 allows the opening operation of the inside handle 3 to be absorbed in the oblong hole 32b, so that the full-open lock opening lever 30 is stopped at an original position as illustrated in FIGS. 3 and 4, rather than being rotated. Further, the full-open lock opening lever 30 is biased in the first rotation direction D1 by an appropriate biasing means.

The inside handle lever 40 has a lever arm 41 which protrudes in the radial direction about the support shaft 21 nearly along the lever arm 31, and a lever arm 42 which protrudes in the radial direction (left direction in FIG. 3) different from the direction of the lever arm 41. Further, a tip end portion of the lever arm 41 of the inside handle lever 40, which is spaced apart from the support shaft 21, is mechanically linked to the inside handle 3. When the inside handle 3 is subjected to the opening operation, the lever arm 41 is pulled toward the inside handle 3, so that the inside handle lever 40 is rotated in the second rotation direction D2. On the contrary, when the inside handle 3 is subjected to the closing operation, the lever arm 41 is pressed, so that the inside handle lever 40 is rotated in the first rotation direction D1. In addition, when the inside handle 3 is maintained at the inside handle neutral position, the inside handle lever 40 is positioned at the inside handle lever initial position illustrated in FIGS. 3 and 4, or when the inside handle 3 returns to the inside handle neutral position, the inside handle lever 40 returns to the inside handle lever initial position.

A substantially elongated release emergency lever 45, as a cancel lever, is rotatably connected to a release emergency lever support shaft 43 provided at the tip end portion of the lever arm 42 of the inside handle lever 40 which is spaced apart from the support shaft 21. A guide hole 46, as a substantially I-shaped cancel guide hole, which extends straight in an extension direction of the release emergency lever 45, is formed through the release emergency lever 45.

The locking lever 80 is connected to the support shaft 21 through a torsion coil spring (not illustrated) wound around the support shaft 21, and the locking lever 80 is biased in the first rotation direction D1 by the torsion coil spring. The locking lever 80 has a pair of lever arms 81 and 82 which protrudes in different radial directions (downward and left-upward in FIG. 3) about the support shaft 21. The lever arm 81 is disposed to overlap the opening lever 70, and a substantially L-shaped oblong hole 83 is formed through the tip end portion of the lever arm 81 which is spaced apart from the support shaft 21. That is, the oblong hole 83 includes an engaging hole 83a which extends straight in the radial direction based on the support shaft 21, and a non-engaging hole 83b which extends in an arc shape in the first rotation direction D1 from a tip end of the engaging hole 83a in the vicinity of the support shaft 21.

A substantially quadrangular claw-shaped interlocking abutment piece 81a is bent approximately at a right angle toward the outside handle lever 60 (a front side orthogonal to the page surface in FIG. 3) at a tip end of the lever arm 81 which is spaced apart from the support shaft 21, that is, a tip end of the lever arm 81 which precedes in the first rotation direction D1. In addition, a substantially quadrangular claw-shaped interlocking abutment piece 81b is bent substantially at a right angle toward the opening lever 70 (the front side orthogonal to the page surface in FIG. 3) at a tip end of the lever arm 81 which is spaced apart from the support shaft 21, that is, a tip end of the lever arm 81 which precedes in the second rotation direction D2.

The lever arm 82 is disposed at a side which precedes the inside handle lever 40 (lever arm 41) in the second rotation direction D2. Further, a substantially I-shaped child lock oblong hole 84, which extends straight in the radial direction about the support shaft 21, is formed through in the lever arm 82. A child lock pin 91 is inserted into and supported in the child lock oblong hole 84 to be reciprocally movable in an extension direction of the child lock pin 91. The child lock pin 91 is connected to a child lock operating unit (not illustrated), and the moving operation of moving the child lock pin 91 from the outside of the slide door 1 is enabled by the child lock operating unit. The child lock pin 91 is moved between a child unlock position, which is close to the support shaft 21 and indicated by a solid line in FIG. 3, and a child lock position, which is spaced apart from the support shaft 21 and indicated by an alternate long and two short dashes line in FIG. 3.

When the child lock pin 91 is positioned at the child unlock position, the child lock pin 91 is positioned within a rotation region of the inside handle lever 40 (lever arm 41), and as a result, when the inside handle lever 40 is rotated in the second rotation direction D2, the child lock pin 91 is integrally rotated together with the locking lever 80. That is, power according to the opening operation of the inside handle 3 may be transmitted from the inside handle lever 40 to the locking lever 80.

In contrast, when the child lock pin 91 is positioned at the child lock position, the child lock pin 91 is positioned out of the rotation region of the inside handle lever 40 (lever arm 41), and as a result, the inside handle lever 40 and the locking lever 80 are separated such that the inside handle lever 40 and the locking lever 80 cannot be interlocked with each other. That is, power according to the opening operation of the inside handle 3 cannot be transmitted from the inside handle lever 40 to the locking lever 80.

The opening lever 70 has a pair of lever arms 71 and 72 which protrudes in substantially radially opposite directions about the support shaft 21. Each of the front lock 6 and the rear lock 7 (pawl driving lever 14) is connected, through one of the cables C1 and C2, to a tip end portion of the lever arm 71 which protrudes at the same side as the inside handle lever 40 (lever arm 41). Further, a stopper portion 71a, which is capable of abutting on a predetermined portion of the base plate 20, is formed at a tip end portion of the lever arm 71 which is spaced apart from the support shaft 21, that is, a tip end of the lever arm 71, which precedes in the first rotation direction D1.

A substantially I-shaped oblong hole 73, which extends straight in the radial direction about the support shaft 21, is formed through the lever arm 72 which overlaps the lever arm 81 of the locking lever 80. When both the opening lever 70 and the locking lever 80 are positioned in the original position illustrated in FIGS. 3 and 4, the oblong hole 73 may overlap the engaging hole 83a of the oblong hole 83. Further, a common locking pin 92 is inserted into the oblong holes 73 and 83. The locking pin 92 is configured to be reciprocally movable in the extension direction of the oblong hole 73.

Here, the opening lever 70 is configured to be capable of abutting on the interlocking abutment piece 81b of the locking lever 80 at a lateral edge portion of the lever arm 72 in the second rotation direction D2. Therefore, the opening lever 70 is biased in the first rotation direction D1 by receiving the biasing force of the torsion coil spring through the locking lever 80. Further, the stopper portion 71a always abuts against the predetermined portion of the base plate 20 such that the rotation in the first rotation direction D1 is restricted, and both the opening lever 70 and the locking lever 80 are positioned at the original position illustrated in FIGS. 3 and 4. In addition, when the opening lever 70 is rotated in the second rotation direction D2 against the biasing force of the torsion coil spring, the cables C1 and C2 connected to the lever arm 71 are pulled toward the remote control device 2 such that the front lock 6 and the rear lock 7 are released together.

The locking pin 92 is mechanically linked to the lock operating knob 4, and the moving operation of the locking pin 92 from the outside of the slide door 1 is enabled by the lock operating knob 4. The locking pin 92 is moved between an unlock position, which is spaced apart from the support shaft 21 as illustrated in FIG. 3, and a lock position, which is close to the support shaft 21.

When the locking pin 92 is positioned at the unlock position, the locking pin 92 is positioned in the engaging hole 83a of the oblong hole 83 such that when the locking lever 80 is rotated in the second rotation direction D2, the opening lever 70, which is pressed by the locking pin 92, can be integrally rotated. That is, power transmission from the locking lever 80 to the opening lever 70 is enabled.

In contrast, when the locking pin 92 is positioned at the lock position, the locking pin 92 is positioned in the non-engaging hole 83b of the oblong hole 83. For this reason, even if the locking lever 80 is rotated in the second rotation direction D2, the locking pin 92 idles in the non-engaging hole 83b, and as a result, the opening lever 70 is not rotated. That is, power of the locking lever 80 is not transmitted to the opening lever 70, and the opening lever 70 stays at the original position.

The remote control device 2 has a locking actuator (not illustrated) which moves the locking pin 92 between the unlock position and the lock position. The locking actuator has an electric motor, as a main part, which is operated by a remote operation (operation of a remote control key or an integrated door lock button in the vehicle), and an output shaft of the locking actuator is mechanically linked to the locking pin 92. The output shaft of the electric motor of the locking actuator rotates forward and rearward, thereby moving the locking pin 92 between the unlock position and the lock position.

That is, the locking pin 92 is moved between the unlock position and the lock position as the lock operating knob 4 is subjected to the moving operation (locking and unlocking operations) or the locking actuator is operated. Of course, the moving operation of the lock operating knob 4, which moves the locking pin 92 to the lock position, is the locking operation, and the moving operation of the lock operating knob 4, which moves the locking pin 92 to the unlock position, is the unlocking operation.

The outside handle lever 60 has a lever portion 61, as an input side lever portion, which protrudes in the radial direction about the support shaft 21 nearly along the locking lever 80 (lever arm 81) and the release lever 50. The lever portion 61 is formed in a substantially L shape, and has an extending portion 61a which extends nearly in the radial direction about the support shaft 21, and a connecting portion 61b which protrudes in the second rotation direction D2 from a tip end of the extending portion 61a which is spaced apart from the support shaft 21.

An oblong hole 62, which has a substantially arc shape based on the support shaft 21, is formed through a tip end portion of the connecting portion 61b (lever portion 61) which is spaced apart from the support shaft 21. The outside handle lever 60 is mechanically linked to the outside handle 5 through the oblong hole 62.

In addition, a substantially L-shaped switching hole 63, as a switching concave portion, is formed through the connecting portion 61b (lever portion 61) to be closer to the support shaft 21 than the oblong hole 62. That is, the switching hole 63 includes a substantially quadrangular restriction portion 63a which extends in the radial direction based on the support shaft 21, and a substantially fan-shaped permission portion 63b which extends in the second rotation direction D2 from a tip end of the restriction portion 63a in the vicinity of the support shaft 21. Further, an interlocking abutment piece 61c is bent approximately at a right angle toward the full-open lock opening lever 30 (the front side orthogonal to the page surface in FIG. 3) at a tip end of the connecting portion 61b in the vicinity of the support shaft 21, that is, a tip end of the connecting portion 61b which precedes in the second rotation direction D2. The interlocking abutment piece 61c is disposed opposite to the interlocking abutment piece 32a in the second rotation direction D2 of the outside handle lever 60.

Meanwhile, a substantially quadrangular claw-shaped interlocking abutment piece 61d is bent approximately at a right angle toward the locking lever 80 (the depth-side orthogonal to the page surface in FIG. 3) at a tip end, which precedes in the first rotation direction D1 as an intermediate portion in a longitudinal direction of the extending portion 61a (lever portion 61). The interlocking abutment piece 61d is disposed opposite to the interlocking abutment piece 81a in the second rotation direction D2 of the outside handle lever 60.

Here, the outside handle lever 60 is configured to be capable of abutting on the interlocking abutment piece 32a of the full-open lock opening lever 30 at the interlocking abutment piece 61c thereof. Further, the outside handle lever 60 is biased in the first rotation direction D1 by receiving the biasing force of the biasing means through the full-open lock opening lever 30. Further, the outside handle lever 60 always abuts on a predetermined portion of the base plate 20 at a lateral edge portion of the lever portion 61 in the first rotation direction D1, so that the outside handle lever is positioned at an outside handle lever initial position as an input lever initial position as illustrated in FIGS. 3 and 4. In addition, the full-open lock opening lever 30 is positioned at the original position illustrated in FIGS. 3 and 4 through the outside handle lever 60 that abuts on the base plate 20.

When the outside handle 5 is subjected to the opening operation, the lever portion 61 is pulled toward the outside handle 5, and the outside handle lever 60 is rotated about the support shaft 21 from the outside handle lever initial position in the second rotation direction D2. In this case, the locking lever 80 of which the interlocking abutment piece 81a is pressed against the interlocking abutment piece 61c and the full-open lock opening lever 30 of which the interlocking abutment piece 32a is pressed against the interlocking abutment piece 61d are integrally rotated in the second rotation direction D2.

Therefore, in a case in which the locking pin 92 is positioned at the unlock position when the outside handle 5 is subjected to the opening operation, the opening lever 70 is integrally rotated in the second rotation direction D2 through the outside handle lever 60, the locking lever 80, and the locking pin 92. Then, the cables C1 and C2 connected to the lever arm 71 of the opening lever 70 are pulled toward the remote control device 2 such that the front lock 6 and the rear lock 7 (the restriction on the rotation of the latch 11 by the pawl 12) are released. That is, the front lock 6 and the rear lock 7 are released when the operating force of the outside handle 5 is transmitted to the opening lever 70 through the outside handle lever 60, the locking lever 80, and the locking pin 92.

Otherwise, when the outside handle 5 is subjected to the opening operation, the full-open lock opening lever 30 is integrally rotated in the second rotation direction D2 through the outside handle lever 60 regardless of the position (the unlock position or the lock position) of the locking pin 92, that is, regardless of the locking and unlocking operations of the lock operating knob 4. Then, the cable C3 connected to the lever arm 31 of the full-open lock opening lever 30 is pulled toward the remote control device 2 such that the full-open lock 8 (the restriction on the rotation of the latch 11 by the pawl 12) is released. That is, the full-open lock 8 is released as the operating force of the outside handle 5 is transmitted to the full-open lock opening lever 30 through the outside handle lever 60.

The release lever 50 has a lever portion 51, as a release side lever portion, which protrudes in the radial direction based on the support shaft 21 nearly along the locking lever 80 (lever arm 81) and the outside handle lever 60 (lever portion 61). The lever portion 51 has an extending portion 51a which extends nearly in the radial direction about the support shaft 21, and a connecting portion 51b which protrudes in the second rotation direction D2 from a tip end of the extending portion 51a which is spaced apart from the support shaft 21, so that the release lever 50 is formed in a substantially L shape. Further, a substantially hook-shaped spring locking portion 51c is installed to protrude at a tip end of the extending portion 51a which is spaced apart from the support shaft 21.

A substantially arc-shaped oblong hole 52, which extends in a circumferential direction about the support shaft 21, is formed through the connecting portion 51b (lever portion 51). The release lever 50 is mechanically linked to an output shaft of a release motor 9 through the oblong hole 52. The release motor 9 is operated by a remote operation (operation of a remote control key or a door opening and closing button in the vehicle). Further, the output shaft of the release motor 9 rotates forward and rearward such that the release lever 50 is rotated in the second rotation direction D2 and the first rotation direction D1.

Meanwhile, a substantially I-shaped guide hole 53, as a release guide hole, which extends in the radial direction based on the support shaft 21, is formed through a tip end portion of the extending portion 61a (lever portion 61) which is spaced apart from the support shaft 21. Of course, the guide hole 53 extends in a direction intersecting the extension direction of the guide hole 46 of the release emergency lever 45. A release emergency pin 93, as a connecting member and a connecting pin, is inserted into and supported in the guide hole 53 to be reciprocally movable in the extension direction of the guide hole 53. The release emergency pin 93 is inserted into the guide hole 46 of the release emergency lever 45 to be reciprocally movable in the extension direction of the guide hole 46, and movably inserted into the switching hole 63 of the outside handle lever 60. Further, the other leg portion of a release emergency pin initial return spring 94, as a biasing member, which has one leg portion hooked by the spring locking portion 51c, is hooked by the release emergency pin 93. For this reason, the release emergency pin 93 is biased by the release emergency pin initial return spring 94 in a direction in which the release emergency pin 93 is spaced apart from the support shaft 21 along the guide hole 53.

When the release emergency pin 93 is fitted into the restriction portion 63a of the switching hole 63, the release lever 50 is integrally rotatably connected to the outside handle lever 60 through the release emergency pin 93. That is, power transmission is enabled between the release lever 50 and the outside handle lever 60. Therefore, the release lever 50 is biased in the first rotation direction D1 by receiving the biasing force of the biasing means through the release emergency pin 93, the outside handle lever 60, and the like. Further, the release lever 50 is always positioned at a release lever initial position illustrated in FIGS. 3 and 4 together with the outside handle lever 60 positioned at the outside handle lever initial position, or the release lever 50 returns to the release lever initial position when the outside handle lever 60 returns to the outside handle lever initial position.

Figure 6:
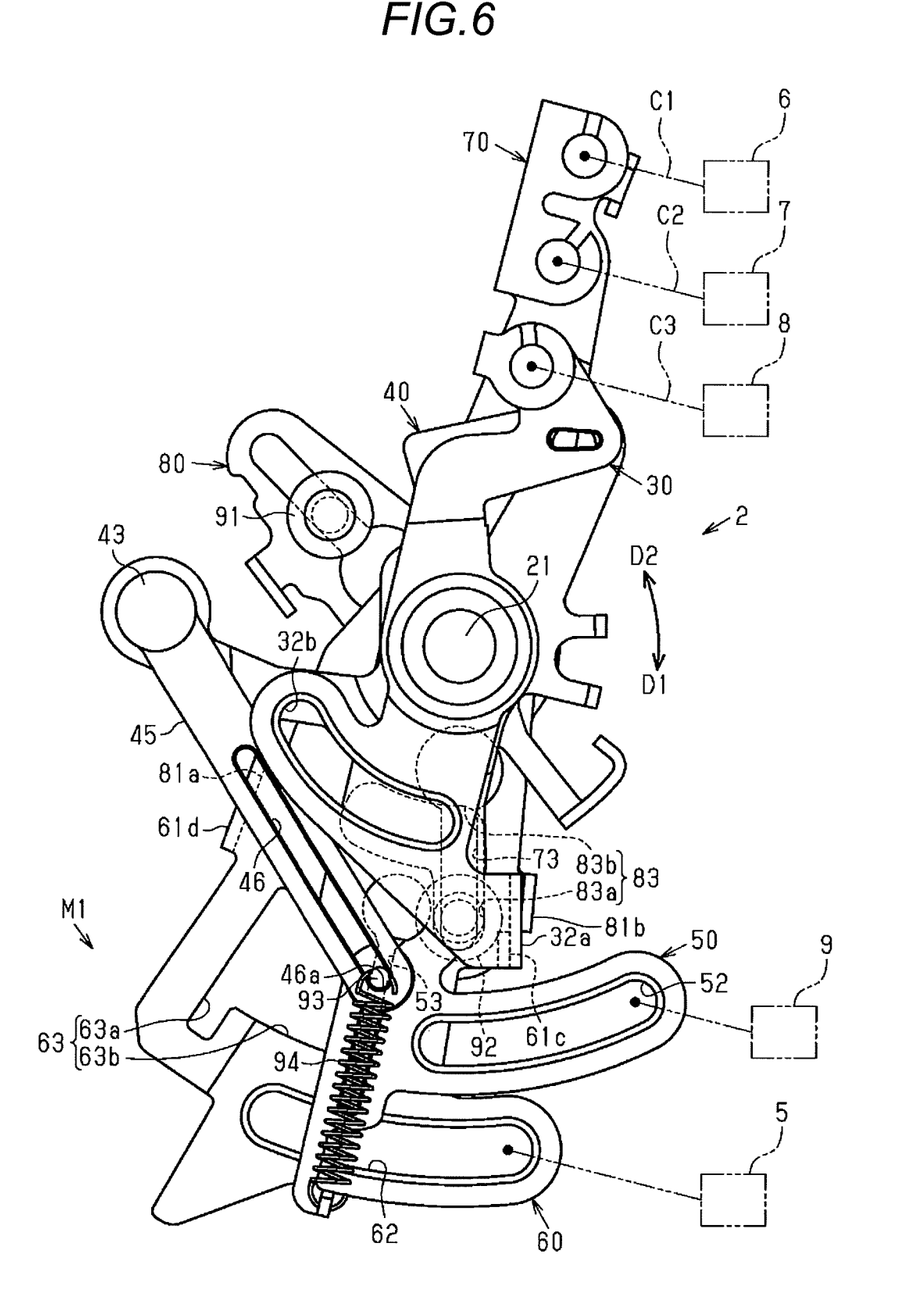
FIG. 6 is a front view illustrating a structure in a release emergency operating state with respect to the vehicle opening and closing body operating device according to the exemplary embodiment.

In contrast, as illustrated in FIG. 6, when the release emergency pin 93 is inserted into the permission portion 63b of the switching hole 63, the release lever 50 and the outside handle lever 60 are rotatable relative to each other within a range in the circumferential direction of the permission portion 63b.

A cancel mechanism M1 is configured by the lever portion 51 which is formed with the guide hole 53, the release emergency lever 45 which is formed with the guide hole 46, the lever portion 61 which has the restriction portion 63a and the permission portion 63b, and is formed with the switching hole 63 into which the release emergency pin 93 is inserted, and the release emergency pin initial return spring 94.

Here, when the release motor 9 is operated, the release lever 50 is pulled toward the release motor 9, and rotated in the second rotation direction D2 from the release lever initial position. In this case, in a state in which the locking pin 92 is disposed at the unlock position and the release emergency pin 93 is fitted into the restriction portion 63a of the switching hole 63, the outside handle lever 60 of which the restriction portion 63a is pressed against the release emergency pin 93, is integrally rotated in the second rotation direction D2, as indicated by a change to FIG. 5. Further, the full-open lock opening lever 30 of which the interlocking abutment piece 32a is pressed against the interlocking abutment piece 61c is integrally rotated in the second rotation direction D2 against the biasing force of the biasing means. In this case, the full-open lock 8 is released as already described. In addition, the locking lever 80 of which the interlocking abutment piece 81a is pressed against the interlocking abutment piece 61d and the opening lever 70 of which the oblong hole 73 is pressed against the locking pin 92 are integrally rotated in the second rotation direction D2 against the biasing force of the torsion spring. In this case, the front lock 6 and the rear lock 7 are released as already described.

Figure 5:
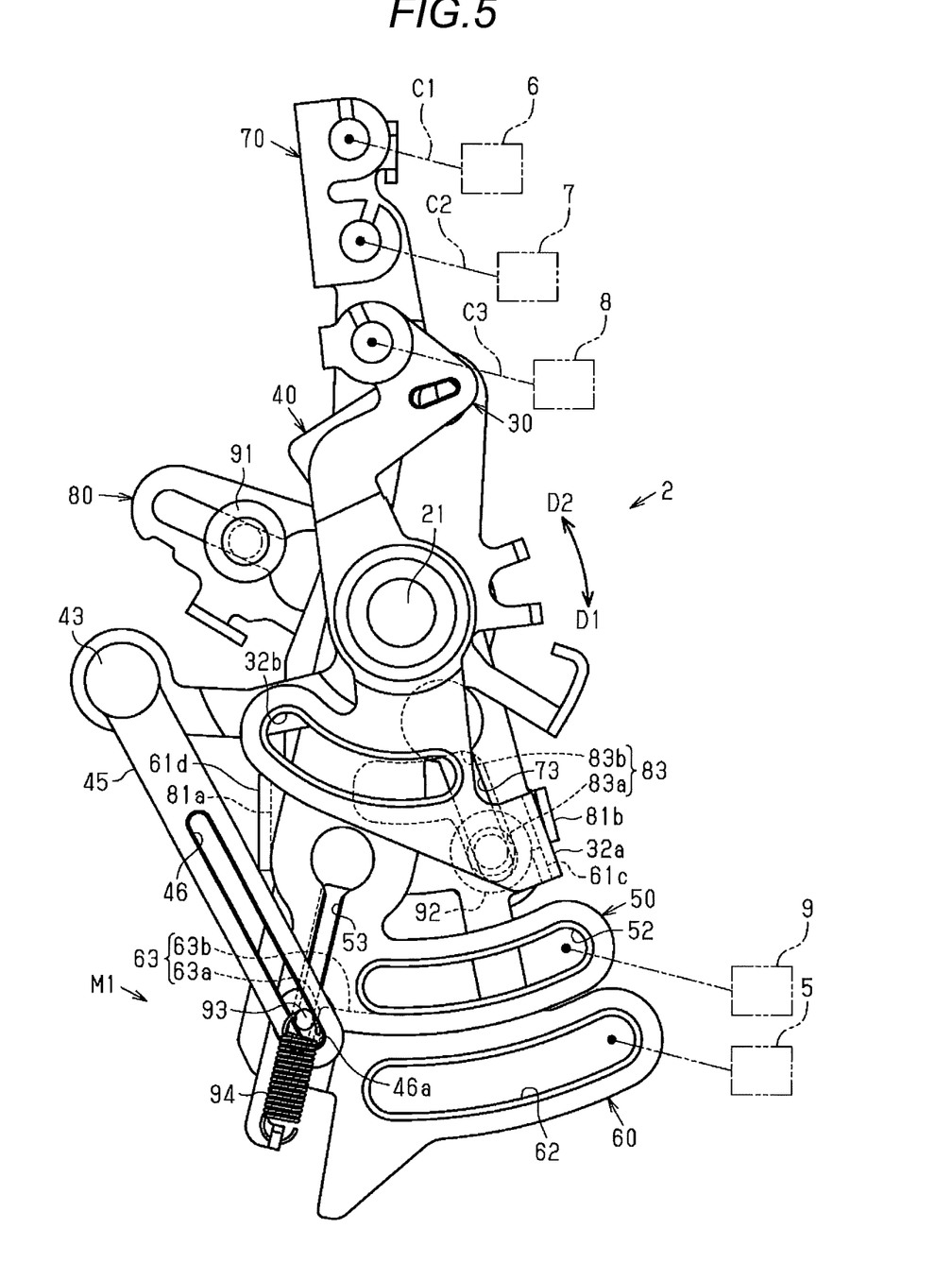
FIG. 5 is a front view illustrating a structure in a release operating state with respect to the vehicle opening and closing body operating device according to the exemplary embodiment.

Even if the release motor 9 is operated, the locking pin 92 does not press the opening lever 70 (oblong hole 73) by the rotation of the locking lever 80 of which the interlocking abutment piece 81a is pressed against the interlocking abutment piece 61d, as long as the locking pin 92 is disposed at the lock position. Therefore, the opening lever 70 is still at the original position.

Meanwhile, the release emergency lever 45 is rotated, counterclockwise about the release emergency lever support shaft 43 in the drawing while sliding the release emergency pin 93 in the guide hole 46. Further, as long as the release emergency pin 93 does not reach a terminal end 46a of the guide hole 46 which is spaced apart from the release emergency lever support shaft 43, the inside handle lever 40 stays at the inside handle lever initial position, rather than being rotated. In other words, when the release emergency pin 93 reaches the terminal end 46a of the guide hole 46, the release emergency lever 45 is pulled by the release emergency pin 93 such that the inside handle lever 40 is rotated in the second rotation direction D2 from the inside handle lever initial position.

It is assumed that the release lever 50 is stopped due to a failure related to the release motor 9 in a state in which the release lever 50 is rotated from the release lever initial position. The "failure related to the release motor 9" described herein includes not only an electrical failure of the release motor 9 itself, but also a physical failure such as adherence of mechanical elements connected to the release motor 9. In this case, the release emergency pin 93 is fitted into the restriction portion 63a, and the outside handle lever 60 is stopped. Further, the full-open lock opening lever 30, which is engaged with the outside handle lever 60, is stopped, and similarly, the locking lever 80, which is engaged with the outside handle lever 60, is stopped together with the opening lever 70. That is, the opening lever 70 does not return to the original position, and as a result, the closed state of the slide door 1 cannot be maintained by the front lock 6 and the rear lock 7. Otherwise, the full-open lock opening lever 30 does not return to the original position, and as a result, the fully opened state of the slide door 1 cannot be maintained by the full-open lock 8.

In this case, when the inside handle 3 is subjected to the closing operation, the inside handle lever 40 is rotated in the first rotation direction D1 while sliding the release emergency pin 93 in the guide hole 46 of the release emergency lever 45. Further, as indicated by a change to FIG. 6, when the release emergency pin 93 reaches the terminal end 46a of the guide hole 46, the inside handle lever 40 pulls the release emergency pin 93 through the terminal end 46a against the biasing force of the release emergency pin initial return spring 94. In this case, when the release emergency pin 93 is moved from the restriction portion 63a to the permission portion 63b, the outside handle lever 60 is made to be rotatable with respect to the release lever 50, so that the outside handle lever 60 is capable of returning to the outside handle lever initial position. Further, when the outside handle lever 60 returns to the outside handle lever initial position, the full-open lock opening lever 30 returns to the original position, and the locking lever 80 returns to the original position together with the opening lever 70. Therefore, the closed state of the slide door 1 is capable of being maintained by the front lock 6 and the rear lock 7. Otherwise, the fully opened state of the slide door 1 is capable of being maintained by the full-open lock 8.

As illustrated in FIG. 1, an electronic control unit (ECU) 100, which is configured by, for example, a microcomputer as a main body, is mounted at an appropriate location in a vehicle. For example, the ECU 100 is electrically connected to various types of switches or the like mounted in the slide door 1 and detects a state of the slide door 1. That is, the ECU 100 detects a remote operation (the operation of an electronic key or the door opening and closing button in the vehicle) by the occupant, detects a state in which the closed state of the slide door 1 is maintained by the front lock 6 and the like, and detects again a state in which the fully opened state of the slide door 1 is maintained by the full-open lock 8. In addition, the ECU 100 is electrically connected to a handle operating switch (not illustrated) in the vehicle, and detects the opening operation or the closing operation of the inside handle 3 by the occupant. Further, the ECU 100 is electrically connected to a handle operating switch (not illustrated) outside the vehicle, and detects the operation (the opening operation or the closing operation) of the outside handle 5 by the occupant.

Meanwhile, the ECU 100 is electrically connected to the release motor 9, and controls and operates the release motor 9 in accordance with detection results from the various types of switches and the like. In addition, in a case in which, for example, a so-called power slide door device is mounted which electrically opens and closes the slide door 1, the ECU 100 is electrically connected to the power slide door device, and controls and operates the power slide door device in accordance with the detection results from the various types of switches and the like.

Specifically, the ECU 100 operates the release motor 9 in a case in which the front lock 6 and the like are released in accordance with the operation of the inside handle 3 or the outside handle 5. That is, in a case in which the front lock 6 and the like are released, the ECU 100 operates the release motor 9 so that the released state by the front lock 6 and the like is maintained by the release lever 50 until the power slide door device starts operation (the slide door 1 starts electrical opening or closing operation). Otherwise, in a case in which a remote operation (the operation of the remote control key or the door opening and closing button in the vehicle) is performed when the locking pin 92 is positioned at the unlock position, the ECU 100 operates the release motor 9 so as to release the front lock 6 and the like.

Next, an effect as well as an action of the present exemplary embodiment will be described.

(1) In the present exemplary embodiment, when the outside handle 5 is subjected to the closing operation from the outside handle neutral position in the fully opened state of the slide door 1, the outside handle lever 60 is interlockingly rotated from the outside handle lever initial position such that the full-open lock opening lever 30 is rotated from the original position so as to output release operating force. Therefore, the fully opened state of the slide door 1 by the full-open lock 8 is released. Otherwise, when the release lever 50 is rotated from the release lever initial position by the release motor 9, the full-open lock opening lever 30 is rotated from the original position so as to output release operating force through the release emergency pin 93 and the outside handle lever 60 which are positioned at the connection position. Therefore, in any one of the aforementioned states, the full-open lock 8 is turned into the released state such that it is possible to close the slide door 1 in the fully opened state.

Meanwhile, it is assumed that the release lever 50 is stopped and maintained due to an electrical failure or the like of the release motor 9 in a state in which the release lever 50 is rotated from the release lever initial position. In this case, when the inside handle lever 40 is rotated, the release emergency pin 93 is moved from the connection position to a disconnection position by the cancel mechanism M1. For this reason, the outside handle lever 60 is enabled to rotate independently of the release lever 50, and accordingly, the full-open lock opening lever 30 is also enabled to return to the original position. Therefore, it is possible to maintain the slide door 1 in the fully opened state by the full-open lock 8.

During a period until the slide door 1 is sent to a dealer for repair, the slide door 1 may be generally and typically used. For example, even in a case in which a surface inclined downward is provided at a front side of the vehicle, it is possible to inhibit the fully opened slide door 1 from being closed by its own weight.

(2) In the present exemplary embodiment, when the release lever 50 is stopped in a state in which the release lever 50 is rotated from the release lever initial position, it is possible to rotate the inside handle lever 40 with respect to the release lever 50 without moving the release emergency pin 93 to the permission portion 63*b* until the terminal end 46*a* of the guide hole 46 reaches the release emergency pin 93 in the restriction portion 63*a* in accordance with the rotation of the inside handle lever 40. In other words, even if a rotation amount from the release lever initial position at a time in which the release lever 50 is stopped varies, it is possible to move the release emergency pin 93 to the permission portion 63*b* corresponding to a change in rotation amount of the inside handle lever 40.

(3) In the present exemplary embodiment, when the release lever 50 is stopped and maintained due to an electrical failure or the like of the release motor 9 in a state in which the release lever 50 is rotated from the release lever initial position, it is possible to move the release emergency pin 93 to the permission portion 63*b* by performing the closing operation on the inside handle 3 from the inside handle neutral position. As described above, since the slide door 1 returns to a state in which the slide door 1 in the fully opened state by the full-open lock 8 is enabled to be maintained by the operation of the inside handle 3 which is an object to be operated when a user gets in or out of the vehicle, the user may cope with the occurrence of a corresponding situation just by experiencing a simple trial-and-error even if the user has no idea about a solution for the situation.

In addition, since the outside handle lever 60 connected to the outside handle 5 and the like is used as an input lever, it is possible to reduce the number of components. Similarly, since the inside handle lever 40 connected to the inside handle 3 is used as an emergency input lever, it is possible to reduce the number of components.

(4) In the present exemplary embodiment, when the inside handle lever 40 is positioned at the inside handle lever initial position and the release lever 50 is positioned at the release lever initial position, the release emergency pin 93 is positioned at an intermediate portion in the longitudinal direction of the guide hole 46 of the release emergency lever 45. Therefore, when the inside handle lever 40 is rotated in the first rotation direction D1 and the second rotation direction D2 in accordance with the opening and closing operations of the inside handle 3, it is basically not inhibited by the biasing force of the release emergency pin initial return spring 94. For this reason, it is possible to reduce a likelihood that the operating feeling of the inside handle 3 is damaged.

In addition, the exemplary embodiment may be changed as follows.

In the exemplary embodiment, a non-through hole-shaped switching concave portion may be adopted instead of the switching hole 63.

In the exemplary embodiment, the outside handle lever 60 is adopted as an input lever. However, without being limited thereto, an input lever may be separately provided as, for example, a dedicated component.

In the exemplary embodiment, the inside handle lever 40 is adopted as an emergency input lever. However, without being limited thereto, an emergency input lever may be separately provided as, for example, a dedicated component.

In the exemplary embodiment, the cancel mechanism M1, which moves the release emergency pin 93 to the disconnection position by using the closing operation of the inside handle 3, is adopted. In contrast, a cancel mechanism, which moves the release emergency pin 93 to the disconnection position by using the opening operation of the inside handle 3, may be adopted.

In the exemplary embodiment, the cancel mechanism M1, which moves the release emergency pin 93 to the disconnection position by the release emergency lever 45, which is interlocked with the inside handle lever 40, is adopted. In contrast, a cancel mechanism, which directly moves the release emergency pin 93 to the disconnection position by the inside handle lever, may be adopted.

A vehicle opening and closing body operating device according to an aspect of this disclosure includes: a full-open lock opening lever connected to a full-open lock configured to maintain an opening and closing body in a fully opened state, and configured to output release operating force to the full-open lock in accordance with a rotation from an original position; an input lever connected to the full-open lock opening lever and an operating handle, and configured to rotate the full-open lock opening lever so as to output the release operating force in accordance with a rotation from an input lever initial position which is interlocked with a closing operation of the operating handle from a handle neutral position; a release lever connected to the input lever through a connecting member to be rotated by a release motor, and configured to rotate the full-open lock opening lever through the connecting member and the input lever so as to output the release operating force in accordance with a rotation from a release lever initial position; an emergency input lever to which rotation operating force is inputted; and a cancel mechanism configured to move the connecting member from a connection position where the input lever and the release lever are connected to each other to a disconnection position where the input lever and the release lever are disconnected from each other in accordance with the rotation of the emergency input lever when the release lever is stopped in a state in which the release lever is rotated from the release lever initial position.

According to this configuration, for example, when the operating handle is subjected to the closing operation from the handle neutral position in the fully opened state of the opening and closing body, the input lever is interlockingly rotated from the input lever initial position such that the full-open lock opening lever is rotated from the original position so as to output the release operating force. Therefore, the fully opened state of the opening and closing body by the full-open lock is released. Otherwise, when the release lever is rotated from the release lever initial position by the release motor, the full-open lock opening lever is rotated from the original position so as to output the release operating force through the connecting member and the input lever positioned at the connection position. Therefore, in any one of the aforementioned states, the full-open lock is turned into the released state such that it is possible to close the opening and closing body in the fully opened state. Meanwhile, it is assumed that the release lever is stopped and maintained due to an electrical failure or the like of the release motor in a state in which the release lever is rotated from the release lever initial position. In this case, when the emergency input lever is rotated, the connecting member is moved from the connection position to the disconnection position by the cancel mechanism. For this reason, the input lever is enabled to rotate independently of the release lever, and accordingly, the full-open lock opening lever is also enabled to return to the original position. Therefore, it is possible to maintain the opening and closing body in the fully opened state.

In the vehicle opening and closing body operating device, the cancel mechanism may include: a release lever portion provided on the release lever, and having a release guide hole extending in one direction; a cancel lever rotatably connected to the emergency input lever, and having a cancel guide hole extending in a direction intersecting the direction in which the release guide hole extends; an input side lever portion provided on the input lever, and having a switching concave portion into which a connecting pin, as the connecting member which is slidably inserted into the release guide hole and the cancel guide hole, is inserted, and which has a restriction portion configured to restrict a rotation of the connecting pin positioned at the connection position, and a permission portion configured to permit a rotation of the connecting pin positioned at the disconnection position; and a biasing member interposed between the release lever and the connecting pin to bias the connecting pin such that that the connecting pin is positioned at the restriction portion. When the release lever is stopped in a state in which the release lever is rotated from the release lever initial position, the connecting pin may be pressed by a terminal end of the cancel guide hole, which reaches the connecting pin, so that the connection pin is moved to the permission portion against biasing by the biasing member in accordance with a sliding movement of the release guide hole with respect to the connecting pin positioned in the restriction portion, in accordance with a rotation of the emergency input lever.

According to this configuration, when the release lever is stopped in a state in which the release lever is rotated from the release lever initial position, it is possible to rotate the emergency input lever with respect to the release lever without moving the connecting pin to the permission portion until the terminal end of the cancel guide hole reaches the connecting pin in the restriction portion in accordance with the rotation of the emergency input lever. In other words, even if a rotation amount from the release lever initial position at a time in which the release lever is stopped varies, it is possible to move the connecting pin to the permission portion corresponding to a change in rotation amount of the emergency input lever.

In the vehicle opening and closing body operating device, the input lever may be an outside handle lever which is interlocked with a closing operation of an outside handle as the operating handle from a first handle neutral position as the handle neutral position, and the emergency input lever may be an inside handle lever which is connected to the full-open lock opening lever and an inside handle and rotates the full-open lock opening lever so as to output the release operating force in accordance with a rotation interlocked with a closing operation of the inside handle from a second handle neutral position.

According to this configuration, when the release lever is stopped and maintained due to an electrical failure or the like of the release motor in a state in which the release lever is rotated from the release lever initial position, it is possible to move the connecting pin to the permission portion by performing the closing operation on the inside handle from the second handle neutral position. As described above, since the slide door returns to a state in which the opening and closing body in the fully opened state by the full-open lock is enabled to be maintained by the operation of the inside handle which is an object to be operated when a user gets in or out of the vehicle, the user may cope with the occurrence of a corresponding situation just by experiencing a simple trial-and-error even if the user has no idea about a solution for the situation.

In the vehicle opening and closing body operating device, in the cancel mechanism, the connecting pin may be positioned at an intermediate portion in a longitudinal direction of the release guide hole when the emergency input lever is positioned at an emergency lever initial position and the release lever is positioned at the release lever initial position.

According to the aspect of this disclosure, it is possible to maintain the opening and closing body in the fully opened state by means of the full-open lock even though the release lever is stopped due to an electrical failure of the release motor in a state in which the release lever is rotated from the release lever initial position.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle opening and closing body operating device comprising:
    a full-open lock opening lever connected to a full-open lock configured to maintain an opening and closing body in a fully opened state, and configured to output release operating force to the full-open lock in accordance with a rotation from an original position;
    an input lever connected to the full-open lock opening lever and an operating handle, and configured to rotate the full-open lock opening lever so as to output the release operating force in accordance with a rotation from an input lever initial position which is interlocked with a closing operation of the operating handle from a handle neutral position;
    a release lever connected to the input lever through a connecting member to be rotated by a release motor, and configured to rotate the full-open lock opening lever through the connecting member and the input lever so as to output the release operating force in accordance with a rotation from a release lever initial position;
    an emergency input lever to which rotation operating force is inputted; and
    a cancel mechanism configured to move the connecting member from a connection position where the input lever and the release lever are connected to each other to a disconnection position where the input lever and the release lever are disconnected from each other in accordance with the rotation of the emergency input lever when the release lever is stopped in a state in which the release lever is rotated from the release lever initial position,
    wherein the cancel mechanism includes:
        a release lever portion provided on the release lever, and having a release guide hole extending in one direction;

a cancel lever rotatably connected to the emergency input lever, and having a cancel guide hole extending in a direction intersecting the direction in which the release guide hole extends;

an input side lever portion provided on the input lever, and having a switching concave portion into which a connecting pin, as the connecting member which is slidably inserted into the release guide hole and the cancel guide hole, is inserted, and which has a restriction portion configured to restrict a rotation of the connecting pin positioned at the connection position, and a permission portion configured to permit a rotation of the connecting pin positioned at the disconnection position; and a biasing member interposed between the release lever and the connecting pin to bias the connecting pin such that that the connecting pin is positioned at the restriction portion, and when the release lever is stopped in a state in which the release lever is rotated from the release lever initial position, the connecting pin is pressed by a terminal end of the cancel guide hole, which reaches the connecting pin, so that the connection pin is moved to the permission portion against biasing by the biasing member in accordance with a sliding movement of the release guide hole with respect to the connecting pin positioned in the restriction portion in accordance with a rotation of the emergency input lever.

2. The vehicle opening and closing body operating device according to claim 1, wherein the input lever is an outside handle lever which is interlocked with a closing operation of an outside handle as the operating handle from a first handle neutral position as the handle neutral position, and the emergency input lever is an inside handle lever which is connected to the full-open lock opening lever and an inside handle and rotates the full-open lock opening lever so as to output the release operating force in accordance with a rotation interlocked with a closing operation of the inside handle from a second handle neutral position.

3. The vehicle opening and closing body operating device according to claim 1, wherein, in the cancel mechanism, the connecting pin is positioned at an intermediate portion in a longitudinal direction of the release guide hole when the emergency input lever is positioned at an emergency lever initial position and the release lever is positioned at the release lever initial position.

* * * * *